(12) United States Patent
Prust et al.

(10) Patent No.: US 7,211,033 B2
(45) Date of Patent: May 1, 2007

(54) MACHINE TOOL

(75) Inventors: Dirk Prust, Tuttlingen (DE); Rudolf Haninger, Seitingen-Oberflacht (DE); Hans-Henning Winkler, Tuttlingen (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 0 days.

(21) Appl. No.: 10/846,940

(22) Filed: May 14, 2004

(65) Prior Publication Data

US 2005/0014618 A1    Jan. 20, 2005

(30) Foreign Application Priority Data

May 16, 2003   (DE) ................. 103 23 592

(51) Int. Cl.
*B23Q 3/157*   (2006.01)
(52) U.S. Cl. ............... 483/10; 483/2; 483/7; 483/12; 483/43; 483/902
(58) Field of Classification Search ............... 483/902, 483/2, 7–12, 43
See application file for complete search history.

(56) References Cited

U.S. PATENT DOCUMENTS

| | | | |
|---|---|---|---|
| 3,516,149 A * | 6/1970 | Mickas ................. 483/34 |
| 3,765,291 A * | 10/1973 | Stenfeldt ............... 83/563 |
| 3,953,039 A * | 4/1976 | Hauge et al. ........... 483/34 |
| 3,964,616 A * | 6/1976 | Piotrowski ............. 414/729 |
| 4,091,526 A * | 5/1978 | Nakaso et al. .......... 483/7 |
| 4,141,133 A * | 2/1979 | Grinage ................ 483/9 |
| 4,196,506 A * | 4/1980 | Reed ................... 483/41 |
| 4,321,746 A * | 3/1982 | Grinage ................ 483/9 |
| 4,356,621 A * | 11/1982 | Tomita et al. .......... 483/7 |
| 4,399,603 A * | 8/1983 | Reed ................... 483/7 |
| 4,409,721 A * | 10/1983 | Tomita et al. .......... 483/7 |
| 4,557,035 A | 12/1985 | Rütschle et al. ........ 29/568 |
| 4,615,101 A * | 10/1986 | Edwards et al. ......... 483/7 |
| 4,827,599 A | 5/1989 | Winkler et al. ......... 29/568 |
| 4,844,678 A * | 7/1989 | Schenk ................. 414/223.01 |
| 4,879,802 A | 11/1989 | Winkler et al. ......... 29/568 |
| 5,044,063 A * | 9/1991 | Voellmer ............... 483/59 |
| 5,201,695 A | 4/1993 | Ruetschle et al. ....... 483/3 |

(Continued)

FOREIGN PATENT DOCUMENTS

DE     33 20 851 A1   12/1984

(Continued)

*Primary Examiner*—Monica Carter
*Assistant Examiner*—Eric A. Gates
(74) *Attorney, Agent, or Firm*—Weingarten, Schurgin, Gagnebin & Lebovici LLP (57) ABSTRACT

A machine tool has at least one working spindle, in which a tool receptacle for tool holders is provided. Furthermore, there is a tool-changing arm with a gripper, for a tool holder in order to transfer this tool holder between its magazine position, which is spaced apart from the tool receptacle, and its working position, in which the tool holder can be clamped into the tool receptacle. Orientation means are provided between the gripper and the tool holder supported by it and secure the tool holder in a nonrotatable manner on the gripper at least during its transfer between the magazine position and the working position and release it after it has been clamped into the tool receptacle, with the result that the tool holder can be rotated in relation to the gripper.

10 Claims, 7 Drawing Sheets

U.S. PATENT DOCUMENTS

| | | | |
|---|---|---|---|
| 5,662,567 A | 9/1997 | Rütschle et al. | 483/10 |
| 5,772,566 A | 6/1998 | Schweizer et al. | 483/47 |
| 5,879,277 A * | 3/1999 | Dettman et al. | 483/13 |
| 6,162,154 A * | 12/2000 | Davis | 483/1 |
| 7,037,248 B2 * | 5/2006 | Takaku | 483/11 |
| 7,115,082 B2 * | 10/2006 | Prust et al. | 483/11 |
| 2002/0115541 A1 * | 8/2002 | Patel et al. | 483/1 |

FOREIGN PATENT DOCUMENTS

| | | |
|---|---|---|
| DE | 40 31 997 A1 | 4/1992 |
| EP | 0 249 898 A2 | 12/1987 |
| EP | 0 291 828 A2 | 11/1988 |
| EP | 0 297 828 A1 | 1/1989 |
| EP | 0 354 467 A2 | 2/1990 |
| EP | 0 681 880 A1 | 11/1995 |
| EP | 0 761 384 A1 | 3/1997 |

* cited by examiner

MACHINE TOOL

CROSS REFERENCE TO RELATED APPLICATIONS

Pursuant to 35 U.S.C. § 2.19 (a)–(d), a claim of foreign priority to German Application No. 103 23 592.2 filed on May 16, 2002 is made.

BACKGROUND OF THE INVENTION

1. Field of the Invention

The present invention relates to a machine tool having at least one working spindle, in which working spindle a tool receptacle for tool holders is provided, having at least one tool-changing arm with a gripper for a tool holder in order to transfer this tool holder between its magazine position, which is spaced apart from the tool receptacle, and its working position, in which the tool holder can be clamped into the tool receptacle, and having orientation means arranged between the gripper and the tool holder supported by the gripper which orientation means secure the tool holder in a non-rotatable manner on the gripper at least during its transfer between the magazine position and the working position.

2. Related Prior Art

A machine tool of the abovementioned type has frequently been disclosed in the prior art.

DE 33 20 851 A1 and DE 40 31 997 A1, to the disclosure of which reference is expressly made here, disclose a machine tool of the travelling-column type, in which a working spindle having a tool receptacle, which is provided on the front side of the spindle and is intended for clamping standardized tool holders in, can be moved in three directions in space in relation to a work piece. The working spindle is mounted rotatably in a spindle housing on which a sleeve is arranged in a vertically displaceable manner, the sleeve bearing a plurality of tool-changing arms distributed around the working spindle. Each tool-changing arm bears at its lower, free end a gripper, in which a tool holder is held, which can be clamped into the tool receptacle and bears a machining tool on its lower shank.

The tool holders are inserted, depending on requirements, into the tool receptacle, for which purpose the tool-changing arm together with the relevant tool holder is pivoted downwards under the tool receptacle. Raising the sleeve causes the tool holder to then pass with its standardized taper, for example a steep taper or hollow tapered shank, into the tool receptacle where it is clamped in place. The gripper remains on the tool holder during the use of the tool, which is now driven by the working spindle, as a result of which a rapid tool change is possible.

In other words, the tool-changing arms arranged around the working spindle use their grippers to keep the various tool holders in their magazine position, in which they are spaced apart laterally and upwards with respect to the tool receptacle. One tool in each case is pivoted into the working position and, by the sleeve being moved, is inserted into the tool receptacle. While the tool-changing arm with the tool which was previously in operation is being pivoted upwards, another tool-changing arm can already be pivoted downwards in order to clamp a new machining tool into the tool receptacle via the relevant tool holder.

In many cases, it is important to know, in the case of a machine tool of this type, in which orientation the tool has been clamped into the tool receptacle, this being of importance, for example, in the case of a rearwards core drill.

The patent literature describes various constructions for how tools can be inserted "in a positionally correct manner", i.e. in a defined manner with respect to their peripheral alignment, into the tool receptacle of a working spindle.

For example, EP 0 354 467 A2 describes a gripper for a steep-taper tool holder. A thickened, encircling collar is provided between the steep taper, which is inserted into the tool receptacle, and the shank, to which the machining tool is fastened, with a gripper groove which points radially outwards and in which the gripper engages by means of its jaws being provided in the collar. Provided on the gripper is a spring-loaded latching lever, the free end of which engages as a latching lug in a cut-out on the circumference of the tool holder, so that the tool holder is secured in a nonrotatable manner on the gripper during its transfer between the magazine position and the working position. When the tool holder is inserted into the tool receptacle, the latching lever is disengaged from the tool holder via a stop, thus enabling the tool receptacle to be inserted into the rotating spindle. In order to load the grippers, the latching lever may also be disengaged manually.

EP 0 297 828 A1 shows a comparable construction. This publication discloses a gripper which has two moveable jaws for grasping tool holders. The jaws are coupled via a deflecting gear to a bolt which is moved against a spatially fixed stop in order to open the jaws. A projection is provided on one of the jaws and, in the closed state of the jaws, engages in a cut-out on the tool holder, which also brings about here the nonrotatable securing of the tool holder on the gripper.

EP 0 761 384 A1 also shows a similar gripper construction, but the jaws here are not spread via a spatially fixed stop, but rather via a driving unit provided on the gripper, in order to release the tool holder for rotational purposes.

So that the tool holders are clamped into the tool receptacle in a defined angular position, catch slots which are of differing depth or breadth or are arranged on different radii are provided on the standardized tool holders of the steep-taper or hollow tapered shank type. Sliding blocks are provided in the working spindle and, when the tool holder and working spindle are correctly aligned peripherally, engage in the catch slots. An offset of 180° can be detected here, for example, depending on the depth of engagement of the sliding block in the catch slot, as is disclosed, for example, in EP 0 681 880 A1.

If a tool holder is inserted with the aid of the above-described grippers into the tool receptacle in a defined angular position to the working spindle, then the sliding blocks find the catch slots within a very short time, which permits a very rapid tool change. Since the tools are inserted into the tool receptacle with the working spindle rotating at a low coupling speed, the release of the tool holders for rotation in the gripper takes place before the tool holder is clamped into the tool receptacle.

EP 0 249 898 A1 discloses a gripper in which no orientation means are provided in order to hold the tool holder in a defined peripheral alignment with respect to the gripper. The tool holder rests by means of an upper tapered surface of its gripper groove on an inwardly projecting web on the jaws of the gripper, so that a type of frictional connection is produced. When the tool holder is inserted into the tool receptacle, the tool holder is rotated relative to the gripper by the sliding blocks, which rub on an annular surface in which the catch slots are provided, but the friction between the gripper and the tool holder ensures that the sliding block "migrates along" the end surface until it has reached the catch slot and engages therein. Only then is the tool holder completely clamped in the tool receptacle. So that the gripper can remain on the tool holder even during operation, the gripper is now lowered downwards somewhat, so that an air gap is formed between the gripper groove and the web and the tool holder can rotate without friction in the gripper.

A drawback of the last-mentioned construction is that the tool-changing time is not defined since the tool holder is set in any desired angular position of the working spindle, which means that the search run of the sliding blocks can last for different lengths of time. In addition, depending on the level of friction between the tool holder and gripper, on the one hand, and tool holder and sliding block, on the other hand, it may take a disproportionately long amount of time until the sliding block has found the correct catch slot.

In order to shorten the tool-changing time and to ensure a defined peripheral alignment of the tool holder with respect to the working spindle, the above-discussed grippers are therefore frequently used with the orientation means, with it being a drawback there that the grippers are of mechanically complex construction.

SUMMARY OF THE INVENTION

In view of the above, it is an object of the present invention to improve a machine tool of the type mentioned at the outset such that a rapid and reliable tool change with a positionally accurate transfer of the tool holder between the magazine position and the working position is possible.

According to the invention, this and other objects are achieved in the case of the machine tool mentioned at the outset by the fact that the orientation means release the tool holder after it has been clamped into the tool receptacle, with the result that it can be rotated in relation to the gripper.

The object underlying the invention is achieved in full in this manner.

The inventors of the present application have namely recognized that a rapid tool change with the working spindle stationary is also possible, this, on the other hand, not permitting the orientation means to open up until after the tool holder has been clamped into the tool receptacle. The tool holder can then be inserted in a known orientation into the tool receptacle where it can immediately be clamped in place without a search run of the sliding blocks being required. The orientation means are then released and the working spindle is brought up to the operating speed.

It should also be noted in this connection that the novel concept of the tool change cannot be realized with the known grippers which are driven against a spatially fixed stop, since the orientation means in the known grippers are always already disengaged before the tool holder has been completely introduced into the tool receptacle. Therefore, even if the known grippers were used to change over tool holders in a stationary working spindle, at a certain time during the tool change there would be an operating state in which the tool holder is not secured in a nonrotatable manner either on the known gripper or even in the tool receptacle. If the tool holder were to be displaced in its peripheral alignment during this short time span, for example by release of the orientation means, it would no longer be possible to couple it into the stationary spindle.

An insertion into the stationary spindle is possible only by the orientation means being released after the tool holder is clamped in the tool receptacle.

According to a further object the orientation means are constructed so as to release the tool holder, which is clamped into the tool receptacle, by moving the gripper in relation to the working spindle, the orientation means preferably being latching means.

This measure is structurally advantageous, since driving units or special manipulation of the gripper are not required in order to actuate a latching lever, for example.

In this case, it is furthermore preferred if the orientation means comprise at least one latching projection which is provided on the gripper and is assigned to an orientation notch on the tool holder.

It is of advantage here that a structurally very simple gripper can be realized on which it is merely necessary to provide at least one latching projection. In this case, a positioning notch provided as standard can serve as the orientation notch on the tool holder.

In such a configuration, a lateral moving or a dropping of the gripper suffices in order to disengage the orientation means. This measure is therefore not only structurally advantageous, it also permits a retrofitting of existing machine tools, since the additional movement of the gripper in order to release the orientation means can easily be programmed via the sequence controller.

Overall, it is preferred if the gripper has webs which project radially inwards and engage in a gripper groove which is formed in an encircling manner on a collar provided on the tool holder, the at least one orientation notch preferably being provided in or in the vicinity of the gripper groove and the at least one latching projection preferably being provided on the web or in its vicinity.

It is of advantage here that standardized tool holders and grippers of conventional construction can be used, it merely being required to provide the at least one latching projection on the web. However, it is also possible for the orientation notch and the latching projection to be arranged as desired on the circumference of the tool holder or of the gripper carrier, as long as they can come into engagement with each other and can be disengaged again.

According to still a further object, the latching projection points upwards towards the tool receptacle and the orientation notch points downwards when the tool holder is inserted into the tool receptacle, the latching projection preferably being a sliding block fastened on the web and the orientation notch being a positioning notch.

It is of advantage here that, after the tool holder is clamped in a rotationally fixed manner to the tool receptacle, the gripper has merely to be lowered to such an extent that the sliding block comes free from the positioning notch.

In this case, it is furthermore preferred if at least two tool-changing arms are provided, the grippers of which remain on the tool holder both in the magazine position and also in the working position, the tool-changing arms preferably being mounted on a sleeve arranged in a longitudinally displaceable manner with respect to the working spindle.

This measure is known per se, see, for example, DE 40 31 997 A1 and DE 33 20 851 A1, to the disclosure of which reference is expressly made herewith.

The tool change in the novel machine tool turns out to be particularly simple in the case of this construction. When the sleeve has been moved downwards, the tool-changing arm with the tool which is to be changed is swung out, so that the axis of rotation of the tool holder comes to lie in alignment with the axis of the working spindle. The sleeve is then moved upwards, as a result of which the tool holder enters into the tool receptacle. Since the peripheral alignment between the tool holder and working spindle is defined by the orientation means and the sequence controller of the working spindle, the tool holder can be clamped in the tool receptacle immediately after the sleeve is raised. The sleeve is then lowered again for a short distance, as a result of which the orientation means are disengaged and the tool holder is rotatable although the gripper remains on the tool holder.

In the case of a machine tool of this type, it is a general object if a positioning indicator is provided for the peripheral alignment of the tool holder with respect to the gripper, the indicator indicating a misalignment between the tool holder and gripper.

This measure is advantageous insofar as a tool holder is prevented from being inserted in a misaligned manner into the tool receptacle. A positioning indicator of this type is not absolutely necessary in machine tools which are coupled into the rotating working spindle, but in the case of machine tools which are coupled into the stationary working spindle, it increases the safety.

According to a still further object the positioning indicator recognizes a misalignment when the tool holder is in the magazine position.

The inventors of the present application have recognized that it suffices to monitor the peripheral alignment between the gripper and the tool holder only in the magazine position, since misalignments cannot occur during the transfer between the magazine position and the working position and in the coupling-in process since the orientation means are in engagement.

It is furthermore preferred if the positioning indicator is assigned a position sensor which recognizes the peripheral alignment of the tool holder with respect to the gripper.

It is advantageous here that use can be made of a simple position sensor in order to detect a possible misalignment. This may be, for example, a magnetic sensor which responds to grooves in the tool holder.

According to another object the positioning indicator is assigned to a tool sheath which is arranged on the tool-changing arm and by which the tool holder is at least partially covered in its magazine position, the positioning indicator preferably also being assigned here a position sensor which recognizes whether the tool holder has reached the magazine position in the tool sheath.

This measure is also of advantage structurally, since the positioning indicator can be provided on the tool sheath which is present in any case, with the result that existing machine tools can also be retrofitted.

It is furthermore preferred if the position sensor is an end-position sensor which indicates if the tool holder does not reach its predetermined magazine position in the tool sheath.

The inventors of the present application have namely recognized that a misalignment between the gripper and tool holder may occur during the exchange of a tool which was previously in use if, for example, chips and coolant are clogging up the positioning notch and/or the sliding block, so that they cannot come into engagement. If the tool-changing arm is very rapidly accelerated and braked during the changing process, such a misalignment, i.e., for example, a tilting, may occur, so that the tool holder can no longer be introduced into the tool sheath or cannot be completely introduced.

In this case, it is preferred if the position sensor is arranged on an actuating unit for the tool-changing arm and is preferably an end-position sensor which indicates whether the tool-changing arm has taken up its predetermined position for the magazine position.

It is advantageous here that it is not absolutely necessary for an additional position sensor to be arranged on the tool sheath in order to check whether the tool holder has reached its magazine position as prescribed. This is because if the tool holder cannot be transferred completely into its magazine position, it is also not possible for the tool-changing arm to take up its position predetermined for the magazine position. Since the tool-changing arm is in any case frequently checked via end-position sensors, use can be made of the signals, which are present in an existing machine tool, from the end-position sensors in order to derive information over a possible misalignment between the tool holder and gripper.

It is preferred overall here if the positioning indicator is assigned a blocking element which prevents the tool holder from taking up its magazine position when it is misaligned with respect to the gripper.

It is advantageous here that not only are tilted tool holders recognized, but also slightly rotated tool holders.

In view of the above, it is preferred if the blocking element comprises a latching element which is arranged on the tool sheath and is assigned a depression on the tool holder, the latching element preferably being arranged in the tool sheath and, when the tool holder is held in a positionally correct manner in the gripper, engaging in a catch slot formed in the tool holder, the latching element preferably furthermore being a shaped element formed integrally with the tubular tool sheath, whereby alternatively the blocking element comprises a recess assigned to a protrusion at the tool holder.

This measure is structurally advantageous; just one latching element or recess has to be formed on or in the tool sheath and can engage in the corresponding depression or receive the respective protrusion only if the tool holder is accurately positioned, but otherwise prevents the tool holder from being entered completely into the tool sheath.

This realizes a structurally simple, but very efficient positioning indicator for the tool holder, which is not only advantageous during operation of the machine tool, but also when the grippers are being equipped with new tool holders. This is because if the operating personnel does not insert a tool holder in a positionally correct manner into the gripper, then this tool-changing arm cannot take up its predetermined magazine position, which can be indicated directly to the operating personnel by the sequence controller of the machine tool.

It is therefore not necessary to provide further safety measures on the gripper preventing the gripper from being equipped with a misaligned tool holder. This is because, for example, standardized tool holders frequently have two orientation notches, which means that they can also be inserted offset through 180° into the gripper, the orientation means also then ensuring that the tool holder is held in a nonrotatable manner with respect to the gripper. In the case of known grippers, extensive measures are provided in order to prevent a tool holder from being clamped in the wrong orientation or the gripper from not being closed correctly because of the wrong orientation, so that it can open during operation of the machine tool and can fall out of the tool.

The novel gripper can now be constructed in a structurally very simple and very reliable manner and a possible misalignment is recognized at the latest when the newly equipped gripper is being raised into the magazine position. For example with an HSK, use is made here of the fact that the catch slots actually provided for the positioning of the tool holder in the tool receptacle differ in depth, so that it is checked, as it were, by the blocking element whether it is introduced into the catch slot having the sufficient depth. This therefore makes it possible easily to recognize not only a misalignment of a few degrees, but also a misalignment of 180°. If only one positioning notch is provided at the tool holder, the tool holder will tilt if it is not inserted into the holder in the correct angular orientation. By this tilting it is prevented that latching element and depression or recess and protrusion, respectively, engage with each other.

In view of the above, the present invention also relates to a tool sheath for a machine tool, having a blocking element which is assigned a depression or a protrusion on a tool holder to be used in the machine tool, the blocking element preferably being a latching element or a recess which is preferably arranged in the tool sheath and is furthermore preferably formed integrally therewith.

The advantages associated with the novel tool sheath have already been explained above in conjunction with the novel machine tool.

The present invention furthermore relates to a gripper for the novel machine tool, which is equipped with the above-described features.

Further advantages emerge from the description and the attached drawing.

It goes without saying that the features mentioned above and those which have yet to be explained below can be used not only in the respectively specified combination, but also in other combinations or on their own without departing from the scope of the present invention.

BRIEF DESCRIPTION OF THE DRAWINGS

An embodiment of the invention is illustrated in the drawing and is explained in greater detail in the following description. In the drawing.

DESCRIPTION OF PREFERRED EMBODIMENTS

Figure 1:
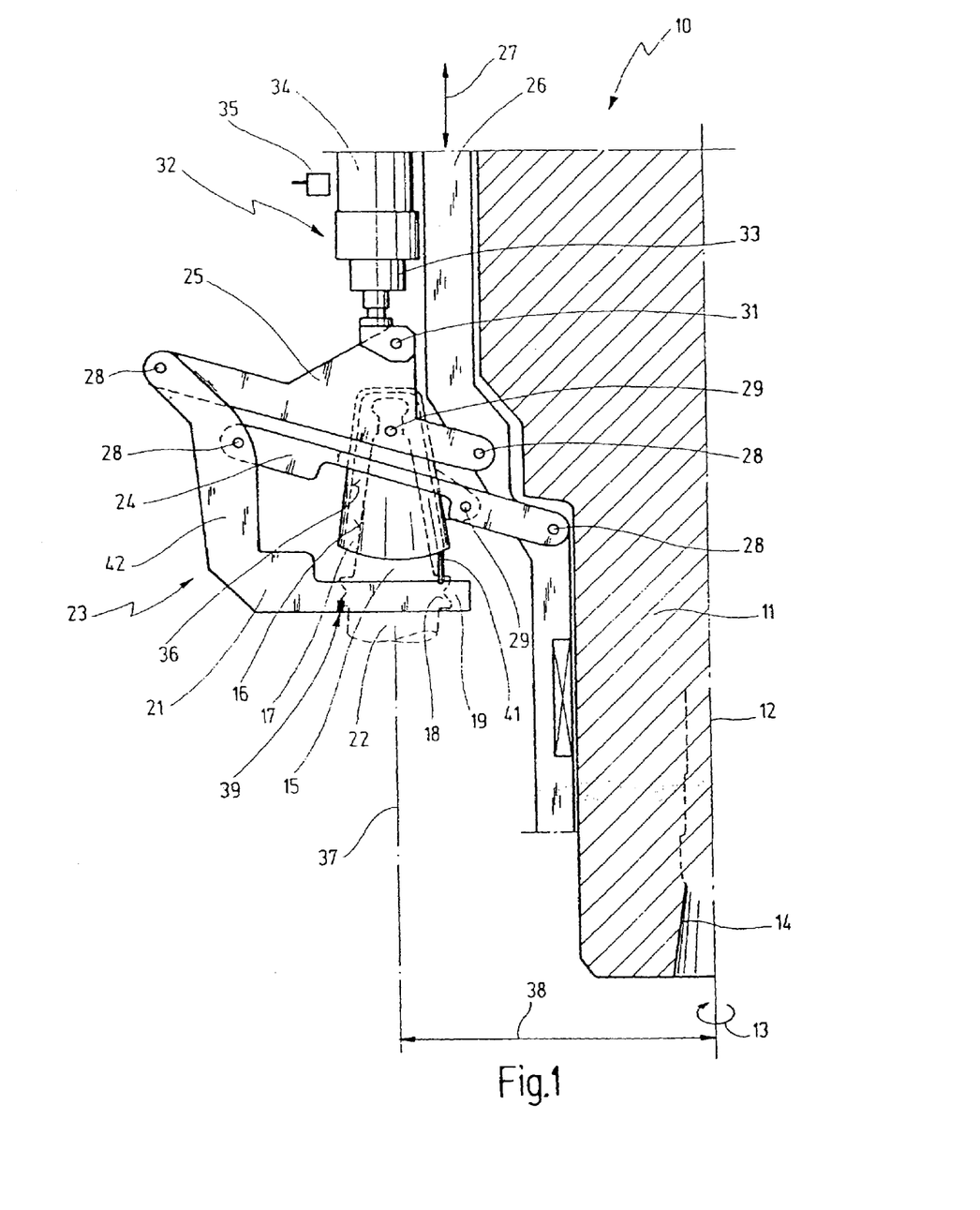
FIG. 1 shows the novel machine tool in a partial longitudinal section, in which a tool-changing arm is in its magazine position.

In FIG. 1, 10 indicates a machine tool whose working spindle is illustrated in a partially cut away manner at 11. The working spindle 11 is mounted rotatably about an axis 12, which is indicated by an arrow 13.

The working spindle 11 has at its lower end a conical tool receptacle 14, into which tool holders can be inserted, such as, for example, one shown at 15 in its magazine position.

The tool holder 15 has a standardized steep taper 16 which is protected from chips flying around by a tool sheath 17 as is generally known.

Below the steep taper 16, the tool holder 15 has a thickened collar 18 with an encircling, outwardly open gripper groove 19 on which the tool holder 15 is held by a gripper 21. In the tool holder 15, the thickened collar 18 is adjoined at the bottom by a shank 22 in which a working tool (not shown in FIGS. 1 and 2) is held.

The gripper 21 is held by a tool-changing arm 23 which comprises, in a manner known per se, a first bar 24 and a second bar 25 via which it is mounted on a sleeve 26 which is mounted in a vertically adjustable manner, which is indicated by an arrow 27, on a spindle housing (not shown in the figures) which surrounds the tool spindle 11. The two bars 24 and 25 are mounted on the sleeve 26 via axles 28 and are connected to the gripper 21, so that a parallelogram-type guide is produced, as is likewise known from the prior art.

The tool sheath 17 is connected to the bars 24 and 25 via axles 29. The bar 25 is connected via a further axle 31 to an actuating unit 32 comprising piston 33 and cylinder 34. The position of the piston 33 in the cylinder 34 is detected via a position sensor 35 which can be an end-position sensor and indicates if the piston 33 has been driven to such an extent into the cylinder 34 that the tool-changing arm 23 and therefore the tool holder 15 have taken up their magazine position in which the steep taper 16 comes to lie in a cavity 36 of the tool sheath 17.

The parallelogram-type guide and the articulated arrangement of the tool sheath on the bars 24 and 25 ensure in a known manner that, when the piston 33 is extended, the tool holder 15 remains with its axis 37 aligned parallel to the axis of rotation 12 and can be pivoted under the tool receptacle 14, for which purpose the sleeve 26 has to be moved downwards. When the axes 12 and 37 are aligned with each other, the sleeve 26 is moved upwards again, so that the tool holder 15 takes up its working position (shown in FIG. 2) in which the steep taper 16 sits in the tool receptacle 14 and is clamped there in a known manner.

However, constructions are also conceivable in which the axis 37 is inclined in the magazine position, so that the tools point radially outwards.

It can also be seen in FIG. 1 that the tool holder 15 in its magazine position is offset laterally from the tool receptacle 14 by a distance 38, the magazine position also being arranged above the tool receptacle 14.

In the case of such a machine tool as is known, for example, from DE 40 31 997 A1, a plurality of tool-changing arms are arranged on the sleeve 26 around the working spindle 11, the grippers 21 in the push-pull mode in each case transporting a tool holder 15 into the tool receptacle 14 and remaining on the tool holder 15 during the machining process.

Orientation means which are indicated at 39 are provided between the tool holder 15 and the gripper 21 and secure the tool holder in a nonrotatable manner on the gripper 21 during its transfer between the magazine position and the working position and only release the tool holder 15 after it is clamped into the tool receptacle 14, so that it can be rotated in relation to the gripper 21 by rotation of the working spindle 11.

Figure 2:
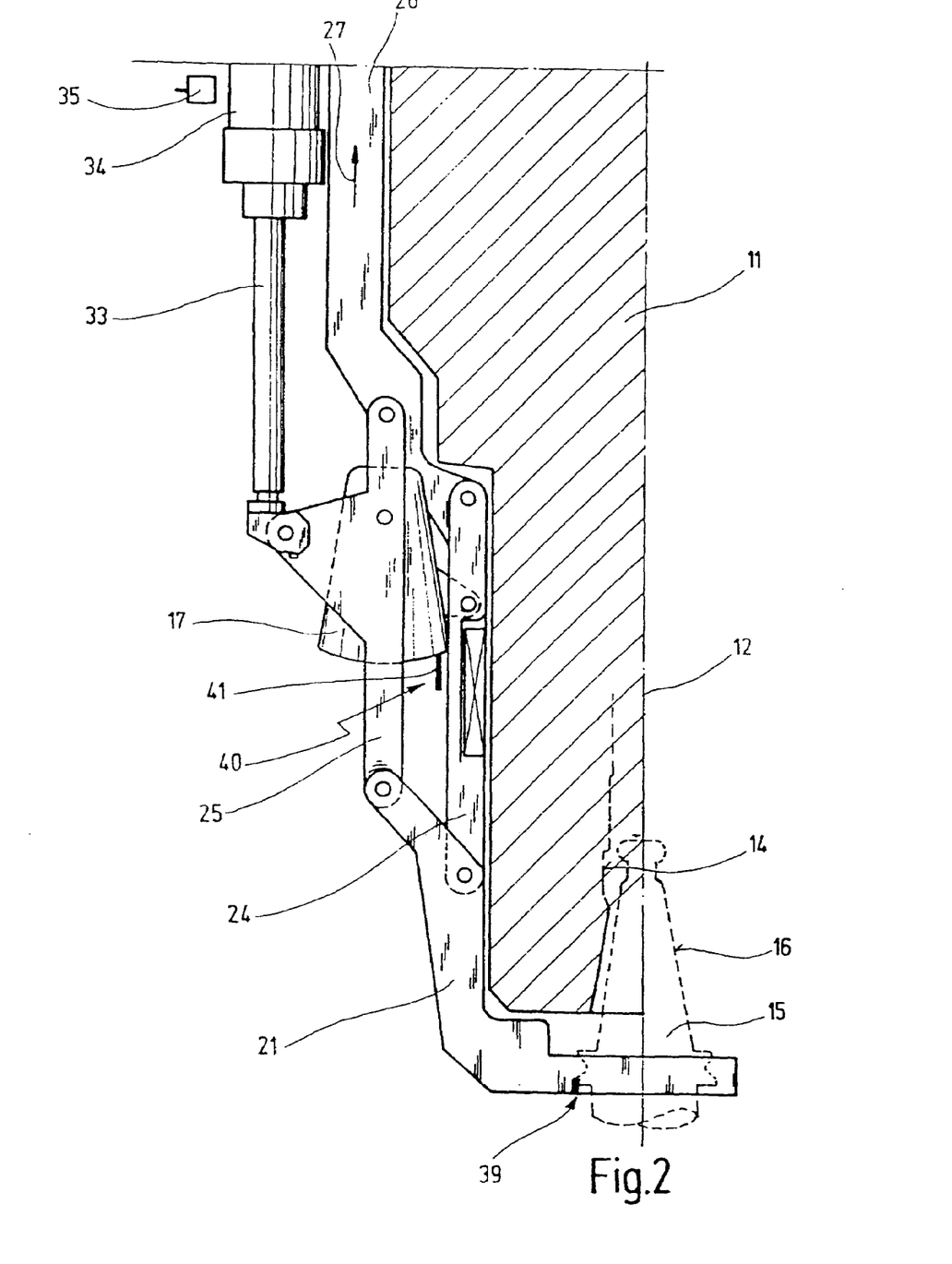
FIG. 2 shows an illustration as in FIG. 1, but with the tool-changing arm in the working position.

In a manner yet to be described in greater detail, the release of the orientation means 39 takes place by the sleeve 26 being lowered downwards by a small amount from the position shown in FIG. 2.

In FIG. 2, a blocking element, which is a latching element 41 in the embodiments of FIGS. 1 and 2, is indicated at 40. In a manner yet to be described, the blocking element 40 prevents the tool holder 15 from taking up its magazine position if peripherally misaligned with respect to the gripper 21. For this purpose, the latching element 41 in the embodiment of FIGS. 1 and 2 engages in a recess provided on the collar 18. If the tool holder 15 is rotated in relation to the gripper 21, the latching element 41 cannot engage in this recess, which means that the gripper 21 cannot be moved far enough upwards for the tool-changing arm to take up its magazine position shown in FIG. 1. This deviation from the magazine position is recognized by the position sensor 35 which indicates this error to the sequence controller of the machine tool 10.

The position sensor 35 and the blocking element 40 therefore form a positioning indicator for the peripheral alignment of the tool holder 15 on the gripper 21. This positioning indicator therefore not only recognizes if a tool holder 15 exchanged from the tool receptacle 14 is rotated or tilted during the acceleration and braking of the gripper 21, which the orientation means 39 could not prevent, for example, because they have been made dirty by chips or coolant. Also when the gripper 21 is being equipped with a tool holder 15, a possible misalignment is immediately recognized if the tool-changing arm 23, which has been extended for equipping purposes, is returned into the magazine position.

Figure 3:
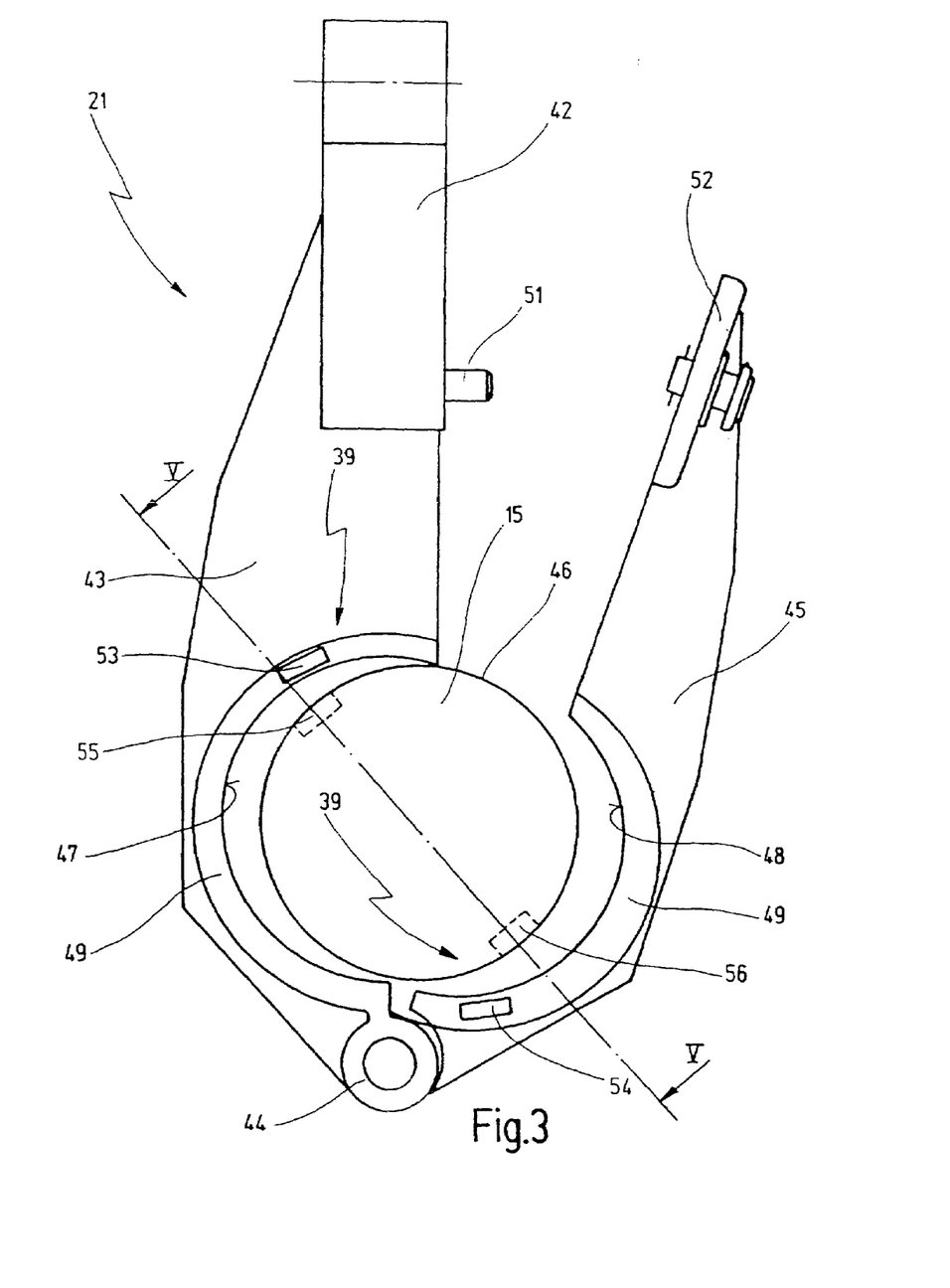
FIG. 3 shows a gripper used in the machine tool from FIGS. 1 and 2 in a plan view and with the jaws open.

The orientation means are now explained in greater detail in conjunction with FIG. 3 which shows a plan view of the gripper 21 from FIGS. 1 and 2.

The gripper 21 is connected to the bars 24 and 25 via an arm 42 on which a first jaw 43, which is connected to a second, foldable jaw 45 via an axle 44, sits. The two jaws 43 and 45 have a semicircular opening 47 and 48, respectively, which are matched to the outer contour (indicated at 46) of the tool holder 15 and into which protrudes a web 49 which projects radially inwards and engages in the gripper groove 19 (not shown in FIG. 3), as is generally known.

For equipping purposes, the gripper 21 is opened in the manner shown in FIG. 3, then a tool holder is inserted and the jaw 45, after closure, is locked via a pin 51 and a fastener 52 to the jaw 43.

The tool holder 15 is now mounted captively in the gripper 21.

Two latching projections 53 and 54 lying diametrically opposite each other are arranged on the web 49 and, in the example shown, are two sliding blocks which have been screwed onto the web 49. The illustration of the screws has been omitted for clarity reasons, it being possible for the sliding blocks also to be fastened with a cohesive material joint, i.e., for example, to be bonded or soldered, or in a frictional or form-fitting manner, i.e., for example, clamped.

The latching projections 53 and 54 are assigned orientation notches 55 and 56 on the tool holder 15, the said notches being open downwards from the plane of projection of FIG. 3. In this manner, the tool holder 15 is, as it were, placed from above onto the latching projections 53, 54 in such a manner that the latter engage in the orientation notches 55, 56 and hold the tool holder 15 in a nonrotatable manner in the gripper 21.

The tool holder 15 from FIG. 3 is what is referred to as a hollow tapered shank tool holder (HSK), which is revealed in the side view of FIG. 4; however, the orientation means acting with a steep-taper tool holder (SK), as it is shown schematically in FIGS. 1 and 2, the same way as it is discussed below in connection with the HSK-tool holder.

Figure 4:
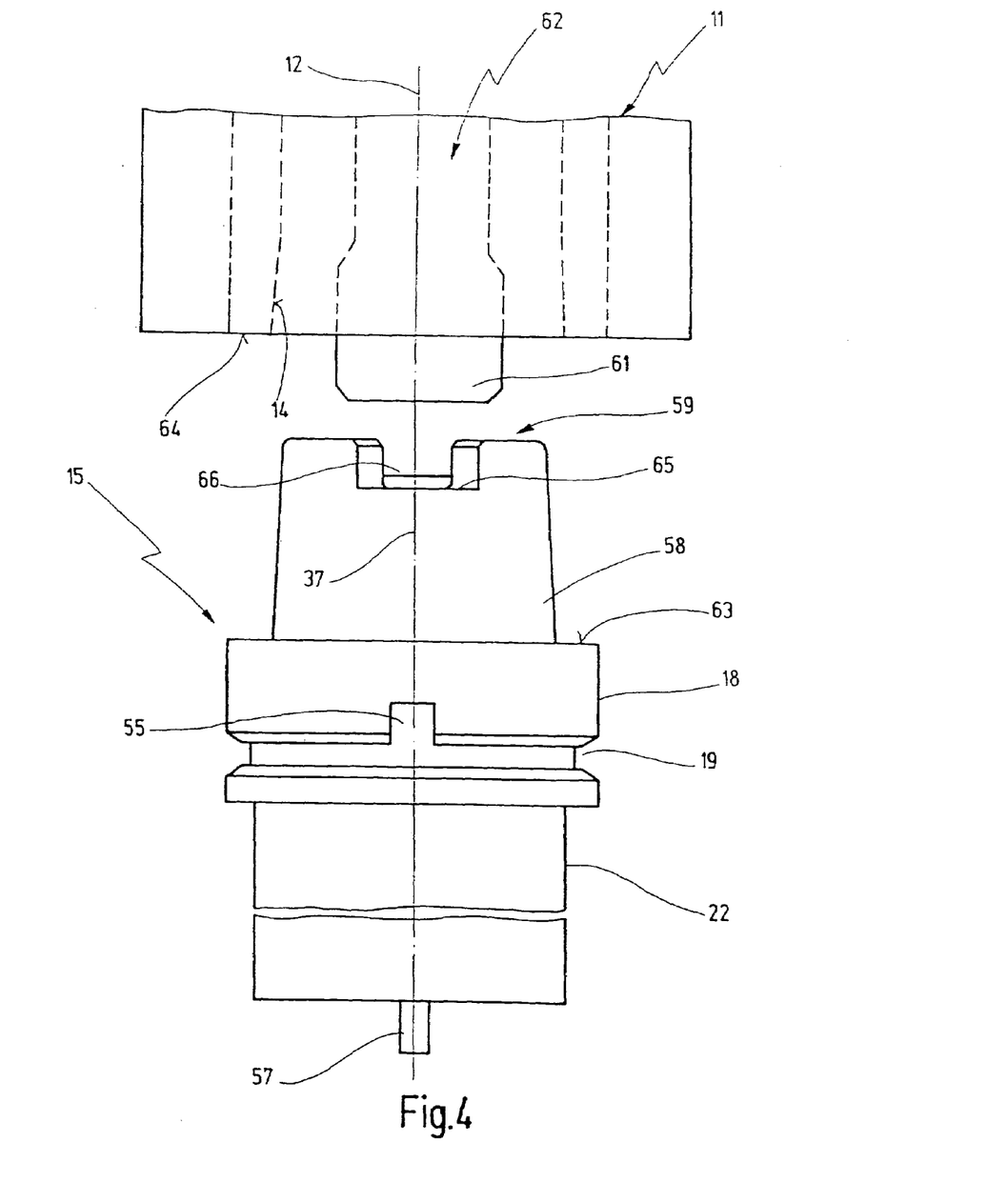
FIG. 4 shows a hollow tapered shank tool holder to be inserted into the gripper from FIG. 3, in a side view with the working spindle illustrated schematically in the region of the tool receptacle.

It can be seen in FIG. 4 that the orientation notch 55 is formed in a downwardly open manner on the collar 18. Furthermore, FIG. 4 shows a machining tool 57 which is fastened to the shank 22.

The tool holder 15 has a hollow tapered shank 58 in whose upwardly pointing opening 59 a drawer-in taper 61 of a clamping system 62 engages, as is shown schematically at the top of FIG. 4. When the tool holder 15 enters into the tool receptacle 14, the drawer-in taper 61 enters into the hollow tapered shank 58, expands and, in the process, draws the tool holder 15 further into the tool receptacle 14. The collar 18 comes with its annular surface 63 into contact with an end surface 64 of the working spindle 11. The planar contact between the annular surface 63 and end surface 64 ensures that the axis 12 of the working spindle 11 and the axis 37 of the tool holder 15 are in alignment.

Figure 5:
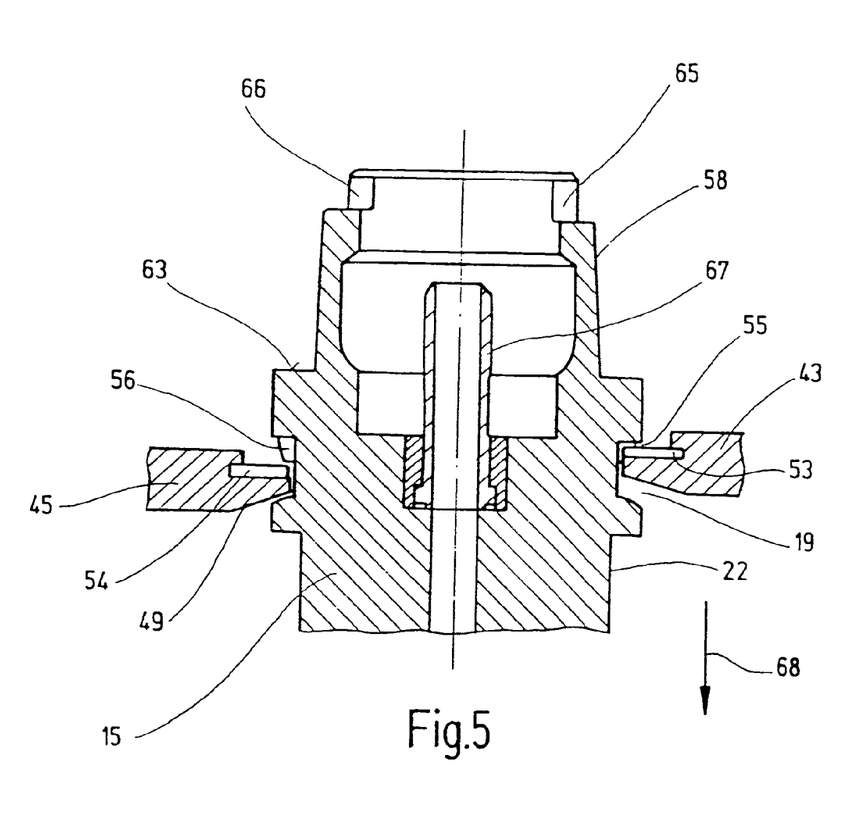
FIG. 5 shows the hollow tapered shank tool holder from FIG. 4 in a longitudinal section along the line V—V from FIG. 3.

The peripheral alignment between the working spindle 11 and tool holder 15 is controlled via two catch slots 65 and 66, the catch slot 65 being cut out further downwards than the catch slot 66, which can be seen particularly readily in the sectional illustration of FIG. 5. FIG. 5 furthermore also shows a small coolant pipe 67 which is arranged inside the tool holder 15 and ensures that the cooling system in the working spindle 11 is connected to the tool 57.

The orientation notches 55 and 56 are shown in the sectional illustration of FIG. 5, with the gripper 21 and its jaws 43 and 45 together with the latching projections 53 and 54 also being indicated in a cut-away form along the line V—V from FIG. 3. In FIG. 5 on the right, the gripper 21 is still in its upper position, in which the latching projection 53 engages in the orientation notch 55, so that the tool holder 15 cannot be rotated. This is the position in which the tool holder 15 is introduced into the tool receptacle 14 and is clamped there. The gripper 21 is then lowered by lowering of the sleeve 26, which is illustrated on the left in FIG. 5 where the latching projection 54 has come free from the orientation notch 56. The orientation notches 55, 56 are positioning notches which are assigned peripherally to the cutting position of the machining tool 57.

During the transfer between the magazine position and the working position, the dead weight of the tool holder 15 causes it to rest on the web 49 which protrudes into the gripper groove 19, the latching projections 53 and 54 being in engagement with the orientation notches 55 and 56, so that the tool holder 15 cannot be rotated in relation to the gripper 21. After the tool holder 15 is clamped into the tool receptacle 14, the gripper 21 is lowered, which is indicated by an arrow 68 in FIG. 5. This can either take place—as mentioned—by lowering of the sleeve 26 or else by further extension of the tool-changing arm 23. The orientation means thereby release the tool holder 15 for rotation in relation to the gripper 21.

After the end of the insertion of the tool 57, the working spindle 11 is braked to a standstill and the gripper 21 is then raised. In the process, the tool holder 15 is aligned in respect of its peripheral position in such a manner that the latching projections 53 and 54 engage in the orientation notches 55 and 56. The sleeve 26 is now lowered, so that the tool holder 15 comes free from the tool receptacle 14. The tool-changing arm is then pivoted into the magazine position, which is shown in FIG. 1, and another tool-changing arm is extended in order to clamp a new tool supported by a tool holder into the working spindle 11.

This tool change takes place at high accelerations, so that there is a risk, if only slight, that the tool holder 15 will spring out of the orientation means, i.e. will become tilted or rotated peripherally. This can take place in particular if chips and coolant have accumulated in the orientation notches 55 and 56 or on the latching projections 53 and 54.

If this possible misalignment were not recognized, the tool holder 15, when next inserted, would not be inserted in a positionally correct manner into the working spindle 11, and so it could possibly not be clamped in place, in which case, furthermore, damage to the clamping system cannot be ruled out.

In order to prevent this, the positioning indicator already discussed in conjunction with FIGS. 1 and 2 is provided. Whereas the latching element 41 in FIGS. 1 and 2 protrudes downwards out of the tool sheath 17, in the case of the tool sheath 17 indicated schematically and in section in FIG. 6, it is arranged inside the tool sheath 17 as a latching element 69. The latching element 69 is formed integrally with the tool sheath 17 as a shaped element.

Figure 6:
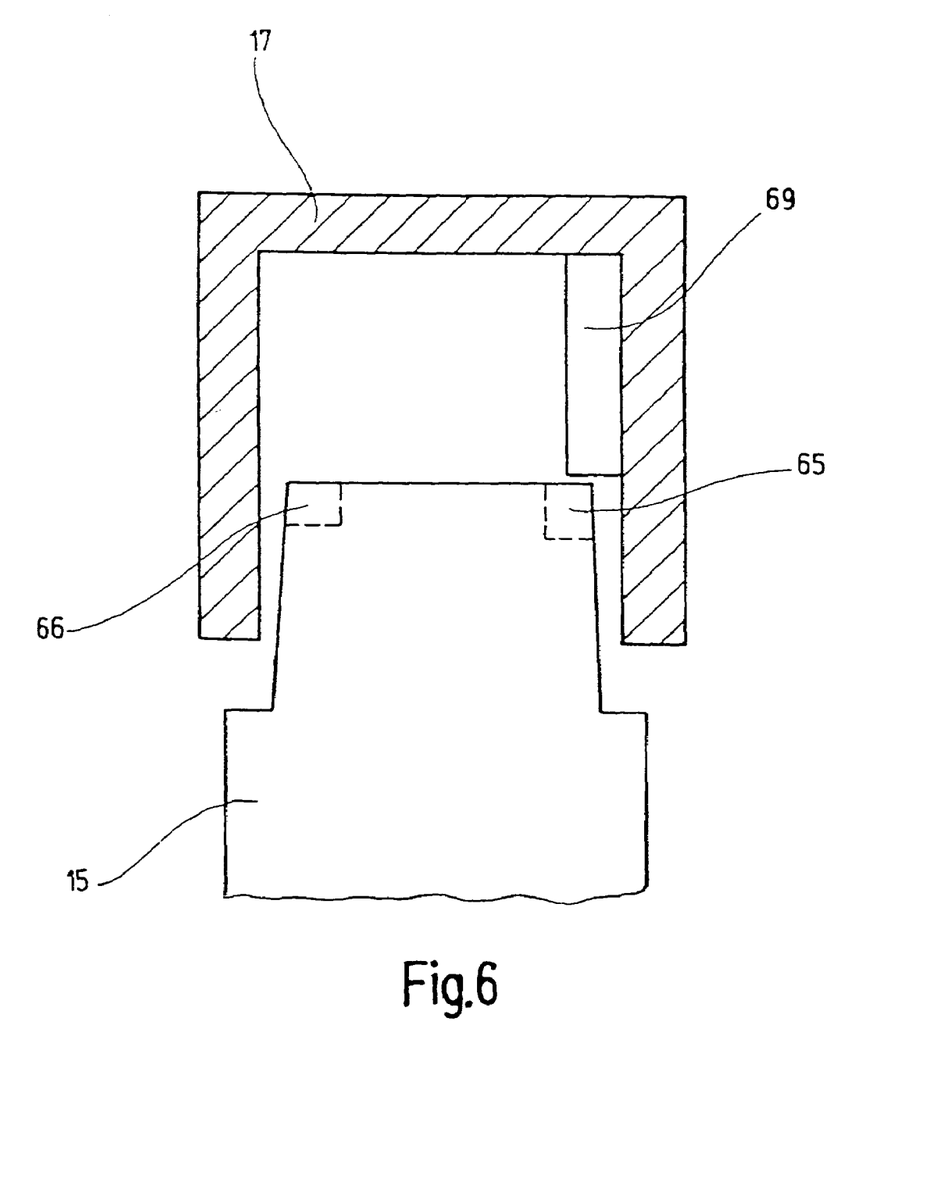
FIG. 6 shows the tool holder from FIG. 4 in a schematic side view with a tool sheath, which is likewise shown schematically, in a sectional illustration.

FIG. 6 furthermore schematically shows an HSK-tool holder 15 with its catch slots 65 and 66. The catch slot 65 is designed to be deeper than the catch slot 66, so that the tool holder 15 can only take up its magazine position in the tubular case 17 if the latching element 69 engages in the deeper catch slot 65. When the tool holder 15 is rotated in the gripper 21, the latching element 69 butts either against the front side of the tool holder 15, or it passes with a rotation through 180° into the insufficiently deep, second catch slot 66. In neither case does the tool holder 15 reach its magazine position, which means, on the other hand, that the tool-changing arm 23 from FIG. 1 can also not take up its magazine position, which is in turn recognized by the position sensor 35.

The positioning indicator formed by the position sensor 35 and the latching element 41 or 69 therefore not only serves to identify a tool holder 15 placed by an operator into the gripper 21 in a wrong orientation, but also prevents during the operation of the novel machine tool 10 a misaligned tool holder 15 from being introduced into the tool receptacle 14 where it cannot be clamped in place and possibly even ensures that the clamping system will be damaged.

Figure 7:
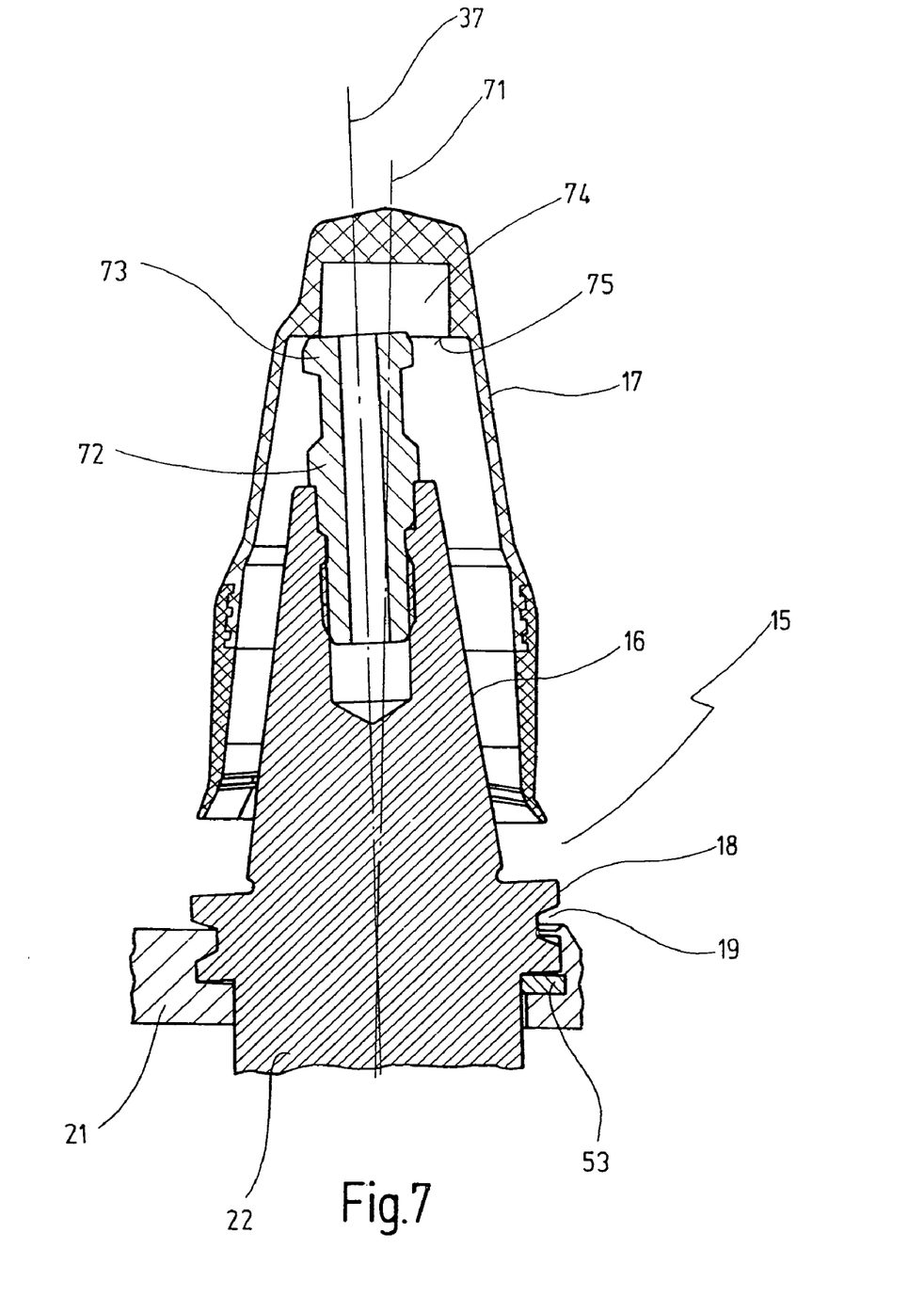
FIG. 7 shows a combined view of FIGS. 5 and 6, but with an SK-instead of an HSK-tool holder.

Although the invention has been described in FIGS. 4 through 6 in connection with an HSK-tool holder, it is also applicable for an SK-tool holder or other tool holders. FIG. 7 shows a combined view of FIGS. 5 and 6, but for an SK-tool holder. In FIG. 7, for the same features the same numerals are used as in FIGS. 4 through 6.

An important difference between an HSK- and an SK-tool holder 15 lies in the fact that the catch slots 15 and 66 shown in FIG. 5 are arranged with the SK-tool holder at the collar 18; however, in FIG. 7 they are not depicted for better intelligibility. A further difference between the HSK-tool holder 15 shown in FIGS. 4 through 6 and the SK-tool holder 15 shown in FIG. 7 lies in the fact that of the orientation notches 55 and 56 shown in FIG. 3, only one orientation notch is provided, so that at gripper 21 only one latching projection 53, i.e. one sliding block, is provided. The orientation notch 55 cannot be seen in FIG. 7 since the tool holder 15 has not been inserted into gripper 21 in correct orientation.

This rotated arrangement of tool holder 15 in gripper 21 leads to the fact that the longitudinal axis 37 of the tool holder 15 is not in alignment with longitudinal axis 71 of the tool sheath 17 but tilted with respect to the latter in FIG. 7 to the left.

A further difference between an HSK-tool holder and an SK-tool holder lies in the fact that the steep taper 16 is not embodied as a hollow tapered shank 58 into which a drawer-in taper 61 of a clamping system 62 engages, but that a tie bolt 72 is screwed into the upper end of steep taper 16, the clamping system 62 of FIG. 4 assessing head 73 of tie bolt 72, however, it does not spread but grips head 73.

In the upper part of tool sheath 17, there is now provided a recess 74 serving as blocking element 40, into which recess 74 head 73 of tie bolt 72 engages in case the longitudinal axis 37 and 71 are in alignment with each other, i.e. the tool holder 15 has been inserted into gripper 21 in correct orientation. Only in this angular orientation, tool holder 15 can be completely received within tool sheath 17, what is recognized by the frequently mentioned position sensor 35.

In case the tool holder 15 is turned with respect to gripper 21, as shown in FIG. 7, head 73 is tilted so far that it cannot engage into recess 74 but butts against a front surface 75. Therefore, tool holder 15 cannot reach completely into tool sheath 17 which is also detected by the position sensor 35 already mentioned.

Of course, it is also possible to provide with an HSK-tool holder only one orientation notch 55, such that it tilts in the case of misalignment the same way as SK-tool holder in FIG. 7. In this case, in tool sheath 17 of FIG. 6 a recess will be provided that corresponds to recess 74 of FIG. 7, into which recess said hollow tapered shaft 58 of the HSK-tool holder of FIG. 4 can then engage when the longitudinal axes of tool sheath 17 and tool holder 15 coincide.

With the embodiment of FIG. 7, head 73 of tie bolt 72 thus acts as a protrusion that engages into recess 74. It is of course possible to provide at another site of the tool holder 15 a protrusion that coacts with a respective recess at the tool sheath 17.

In the case of the machine tool described to this extent, the orientation means provided between the tool holder 15 and the gripper 21 therefore ensure that the tool holder 15 can be introduced in the correct peripheral alignment into the stationary working spindle 11 and can be immediately clamped there. Lowering of the gripper 21 causes the orientation means to be released, so that the working spindle can be brought up to operating speed.

The positioning indicator formed from the position sensor 35 and latching element 41 or 69 monitors the peripheral alignment of the tool holders 15 in their magazine position, so that both a wrong equipping of a gripper 21 and also a rotation or tilting of the tool holder 15 during operation can be recognized. In this case, it is not absolutely necessary for the positioning indicator to be assigned the position sensor 35; it is also possible to fit a separate position sensor in the tool sheath, so that, if appropriate, the latching elements 41 and 69 may also be omitted.

What is claimed is:

1. A machine tool having at least one working spindle, in which working spindle a tool receptacle for tool holders is provided, having at least one tool-changing arm with a gripper for a tool holder in order to transfer this tool holder between its magazine position, which is spaced apart from the tool receptacle, and its working position, in which the tool holder can be clamped into the tool receptacle, and having orientation means arranged between the gripper and the tool holder supported by said gripper, which orientation means secure the tool holder in a nonrotatable manner on the gripper at least during its transfer between the magazine position and the working position, wherein the orientation means release the tool holder after it has been clamped into the receptacle, with the result that it can be rotated in relation to the gripper, and wherein the orientation means comprise at least one latching projection which is provided on the gripper and is assigned to an orientation notch on the tool holder;

wherein the gripper has a web which projects radially inwards and engages in a gripper groove, which is formed in an encircling manner on a collar provided on the tool holder, the at least one orientation notch being provided in or in the vicinity of the gripper groove and the at least one latching projection being provided on the web or in its vicinity, the latching projection pointing upwards towards the tool receptacle and the orientation notch pointing downwards when the tool holder is inserted into the tool receptacle;

wherein a positioning indicator is provided for the peripheral alignment of the tool holder with respect to the gripper, the positioning indicator indicating a misalignment between the tool holder and gripper, and wherein the positioning indicator is assigned a position sensor which recognizes the peripheral alignment of the tool holder with respect to the gripper.

2. The machine tool of claim 1, wherein the position sensor is arranged on an actuating unit for the tool-changing arm.

3. The machine tool of claim 2, wherein the position sensor is an end-position sensor which indicates whether the tool-changing arm has taken up its predetermined position for the magazine position.

4. A machine tool having at least one working spindle, in which working spindle a tool receptacle for tool holders is provided, having at least one tool-changing arm with a gripper for a tool holder in order to transfer this tool holder between its magazine position, which is spaced apart from the tool receptacle, and its working position, in which the tool holder can be clamped into the tool receptacle, and having orientation means arranged between the gripper and the tool holder supported by said gripper, which orientation means secure the tool holder in a nonrotatable manner on the gripper at least during its transfer between the magazine position and the working position, wherein the orientation means release the tool holder after it has been clamped into the tool receptacle, with the result that it can be rotated in relation to the gripper, and wherein the orientation means comprise at least one latching projection which is provided on the gripper and is assigned to an orientation notch on the tool holder;

wherein the gripper has a web which projects radially inwards and engages in a gripper groove, which is formed in an encircling manner on a collar provided on the tool holder, the at least one orientation notch being provided in or in the vicinity of the gripper groove and the at least one latching projection being provided on the web or in its vicinity, the latching projection pointing upwards towards the tool receptacle and the orientation notch pointing downwards when the tool holder is inserted into the tool receptacle, wherein a positioning indicator is provided for the peripheral alignment of the tool holder with respect to the gripper, the positioning indicator indicating a misalignment between the tool holder and gripper, wherein the positioning indicator recognizes a misalignment when the tool holder is in the magazine position, and wherein the positioning indicator is assigned a position sensor which recognizes whether the tool holder has reached the magazine position in the tool sheath.

5. The machine tool of claim 4, wherein the position sensor is an end-position sensor which indicates if the tool holder does not reach its predetermined magazine position in the tool sheath.

6. A machine tool having at least one working spindle, in which working spindle a tool receptacle for tool holders is provided, having at least one tool-changing arm with a gripper for a tool holder in order to transfer this tool holder between its magazine position, which is spaced apart from the tool receptacle, and its working position, in which the tool holder can be clamped into the tool receptacle, and having orientation means arranged between the gripper and the tool holder supported by said gripper, which orientation means secure the tool holder in a nonrotatable manner on the gripper at least during its transfer between the magazine position and the working position, wherein the orientation means release the tool holder after it has been clamped into the tool receptacle, with the result that it can be rotated in relation to the gripper, wherein a positioning indicator is provided for the peripheral alignment of the tool holder with respect to the gripper, the positioning indicator indicating a misalignment between the tool holder and gripper, wherein the positioning indicator is assigned a position sensor which recognizes the peripheral alignment of the tool holder with respect to the gripper.

7. The machine tool of claim 6, wherein the positioning indicator recognizes a misalignment when the tool holder is in the magazine position.

8. The machine tool of claim 7, wherein the position sensor is an end-position sensor which indicates if the tool holder does not reach its predetermined magazine position in the tool sheath.

9. The machine tool of claim 6, wherein the position sensor is arranged on an actuating unit for the tool-changing arm.

10. The machine tool of claim 9, wherein the position sensor is an end-position sensor which indicates whether the tool-changing arm has taken up its predetermined position for the magazine position.

* * * * *